(12) United States Patent
Enomoto et al.

(10) Patent No.: US 11,757,153 B2
(45) Date of Patent: Sep. 12, 2023

(54) CYLINDRICAL BATTERY (71) Applicant: Panasonic Intellectual Property Management Co., Ltd., Osaka (JP)

(72) Inventors: Takeshi Enomoto, Osaka (JP); Kazutoshi Kohira, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 195 days.

(21) Appl. No.: 16/634,684

(22) PCT Filed: Jul. 5, 2018

(86) PCT No.: PCT/JP2018/025523
§ 371 (c)(1),
(2) Date: Jan. 28, 2020

(87) PCT Pub. No.: WO2019/026526
PCT Pub. Date: Feb. 7, 2019

(65) Prior Publication Data
US 2021/0119299 A1    Apr. 22, 2021

(30) Foreign Application Priority Data

Jul. 31, 2017  (JP) ................................. 2017-148259

(51) Int. Cl.
*H01M 50/325* (2021.01)
*H01M 10/04* (2006.01)
(Continued)

(52) U.S. Cl.
CPC ..... *H01M 50/325* (2021.01); *H01M 10/0422* (2013.01); *H01M 10/0477* (2013.01);
(Continued)

(58) Field of Classification Search
CPC ........... H01M 50/325; H01M 10/0422; H01M 10/0477; H01M 10/052; H01M 2200/20;
(Continued)

(56) References Cited

U.S. PATENT DOCUMENTS

| | | | | |
|---|---|---|---|---|
| 2008/0107957 A1* | 5/2008 | Meguro | .............. | H01M 50/367 429/56 |
| 2009/0087724 A1* | 4/2009 | Kim | .................... | H01M 50/166 429/82 |

(Continued)

FOREIGN PATENT DOCUMENTS

| | | |
|---|---|---|
| CN | 201584441 U | 9/2010 |
| CN | 106992271 A | 7/2017 |

(Continued)

OTHER PUBLICATIONS

English Machine Translation of Hwang et al. (KR 20170075658 A) (Year: 2017).*

(Continued)

*Primary Examiner* — Matthew T Martin
*Assistant Examiner* — Adam J Francis
(74) *Attorney, Agent, or Firm* — WHDA, LLP (57) ABSTRACT

A cylindrical battery with an opening sealing body that seals an opening of a battery can. The opening sealing body includes a valve member, a metal plate disposed on an inner side of the battery with respect to the valve member, and an annular insulating member interposed between the valve member and the metal plate. The valve member and the metal plate are connected to each other at respective central portions. The valve member has an annular thin-walled portion which is deformable when an internal pressure of the battery increases. The metal plate and the insulating member have respective holes which communicate with each other. The insulating member has a section that covers a surface, (Continued)

on the valve member side, of the metal plate, and a section that is provided subsequent to the section and covers a lateral surface of the hole of the metal plate.

7 Claims, 4 Drawing Sheets

(51) Int. Cl.
*H01M 10/052* (2010.01)
*H01M 50/147* (2021.01)
*H01M 50/574* (2021.01)
*H01M 50/586* (2021.01)
*H01M 50/593* (2021.01)

(52) U.S. Cl.
CPC ....... *H01M 10/052* (2013.01); *H01M 50/147* (2021.01); *H01M 50/574* (2021.01); *H01M 50/586* (2021.01); *H01M 50/593* (2021.01); *H01M 2200/20* (2013.01)

(58) Field of Classification Search
CPC ............ H01M 50/147; H01M 50/574; H01M 50/586; H01M 50/593; H01M 50/3425; H01M 50/152; H01M 50/159; H01M 50/184; H01M 50/188; H01M 50/578; H01M 10/04
See application file for complete search history.

(56) References Cited

U.S. PATENT DOCUMENTS

| | | | |
|---|---|---|---|
| 2010/0104941 A1* | 4/2010 | Nakabayashi | H01G 9/10 429/181 |
| 2010/0159307 A1 | 6/2010 | Mao et al. | |
| 2010/0178539 A1* | 7/2010 | Elia | H01M 50/578 429/56 |
| 2010/0316894 A1* | 12/2010 | Hermann | H01M 50/3425 429/56 |
| 2011/0052948 A1 | 3/2011 | Pei | |
| 2012/0114979 A1* | 5/2012 | Kim | H01M 50/3425 429/7 |
| 2013/0273401 A1 | 10/2013 | Lee et al. | |
| 2014/0315058 A1* | 10/2014 | Byun | H01M 50/574 429/82 |
| 2017/0062778 A1* | 3/2017 | Mille | H01M 10/052 |
| 2017/0207439 A1 | 7/2017 | Park et al. | |
| 2018/0047973 A1* | 2/2018 | Kunoike | H01M 10/0587 |
| 2018/0062124 A1 | 3/2018 | Kohira et al. | |
| 2019/0103625 A1* | 4/2019 | Haraguchi | H01M 50/578 |
| 2020/0259202 A1* | 8/2020 | Haraguchi | H01M 10/0431 |
| 2020/0313151 A1* | 10/2020 | Haraguchi | H01M 50/171 |

FOREIGN PATENT DOCUMENTS

| | | | | |
|---|---|---|---|---|
| CN | 107925020 A | | 4/2018 | |
| JP | H10233199 A | | 9/1998 | |
| JP | 2000-3700 A | | 1/2000 | |
| JP | 2010-520580 A | | 6/2010 | |
| JP | 3160977 U | | 7/2010 | |
| JP | 2014-524118 A | | 9/2014 | |
| KR | 20170075658 A | * | 7/2017 | ............ H01M 50/30 |
| KR | 20170087281 A | * | 7/2017 | ........ H01M 50/3425 |
| WO | 2016/157749 A1 | | 10/2016 | |
| WO | 2016/157750 A1 | | 10/2016 | |

OTHER PUBLICATIONS

English Translation of Search Report dated Jun. 24, 2022, issued in counterpart to CN Application No. 201880048439.8. (3 pages).
International Search Report dated Aug. 14, 2018, issued in counterpart application No. PCT/JP2018/025523, with English translation. (4 pages).

* cited by examiner

CYLINDRICAL BATTERY

BACKGROUND ART

A general cylindrical battery includes an electrode group, an electrolyte, a battery can that houses the electrode group and the electrolyte, and an opening sealing body that seals an opening of the battery can. The opening sealing body includes a valve member, a metal plate disposed on the inner side of the battery with respect to the valve member, and an annular insulating member interposed between the valve member and the metal plate (see PTL 1). The valve member and the metal plate are connected to each other at respective central portions. The valve member has an annular thin-walled portion which is deformable when the battery internal pressure increases. The metal plate and the insulating member have respective holes which communicate with each other. The above-mentioned opening sealing body includes a current cut-off mechanism.

Hereinafter, the current cut-off mechanism will be described.

When the battery internal pressure increases due to an external short circuit or the like, the valve member receives the pressure through the holes of the metal plate and the insulating member, and the thin-walled portion of the valve member is deformed. Accordingly, the central portion of the valve member is pulled outwardly of the battery along with the central portion of the metal plate. When the battery internal pressure reaches a predetermined value, the surroundings of the connection portion of the metal plate with the valve member is broken, or the connection portion between the metal plate and the valve member is broken. In this manner, a current path between the valve member and the metal plate is cut off.

CITATION LIST

Patent Literature

PTL 1: WO 2016/157749

SUMMARY OF INVENTION

However, since the lateral surface of the hole of the metal plate are not covered by an insulating member, for example, the deformed valve member comes into contact with the inner surface of the hole of the metal plate to become conductive, and the current cut-off mechanism may not operate effectively.

In consideration of what has been described above, an aspect of the present invention relates to a cylindrical battery including: an electrode group; an electrolyte; a battery can that houses the electrode group and the electrolyte; and an opening sealing body that seals an opening of the battery can, the opening sealing body including a valve member, a metal plate disposed on an inner side of the battery with respect to the valve member, and an annular insulating member interposed between the valve member and the metal plate, wherein the valve member and the metal plate are connected to each other at respective central portions, the valve member has an annular thin-walled portion which is deformable when an internal pressure of the battery increases, the metal plate and the insulating member have respective holes which communicate with each other, and the insulating member has a section P1 that covers a surface, on the valve member side, of the metal plate, and a section P2 that is provided subsequent to the section P1 and covers an inner surface of the hole of the metal plate.

According to the present invention, it is possible to provide a highly reliable cylindrical battery in which the current cut-off mechanism operates stably in case of misuse or the like.

DESCRIPTION OF EMBODIMENTS

A cylindrical battery according to an embodiment of the present invention includes: an electrode group; an electrolyte; a battery can that houses the electrode group and the electrolyte; and an opening sealing body that seals an opening of the battery can. The opening sealing body includes a valve member, a metal plate disposed on an inner side of the battery with respect to the valve member, and an annular insulating member interposed between the valve member and the metal plate. The valve member and the metal plate are connected to each other at respective central portions. The valve member has an annular thin-walled portion which is deformable when an internal pressure of the battery increases. The metal plate and the insulating member have respective holes which communicate with each other. The insulating member has a section P1 that covers a surface, on the valve member side, of the metal plate, and a section P2 that is provided subsequent to the section P1 and covers an inner surface of the hole of the metal plate.

The section P2 is further provided subsequent to the section P1, and thereby the insulation distance between the valve member (particularly, the portion on the outer side of the thin-walled portion) and the metal plate is largely ensured. In other words, contact between the valve member and the surface, on the valve member side, of the metal plate is controlled by the section P1, and also contact between the valve member and the inner surface of the hole of the metal plate is controlled by the section P2.

Thus, it is possible to obtain a highly reliable cylindrical battery in which the current cut-off mechanism operates stably in case of misuse or the like.

It is sufficient that the section P2 cover at least part (for example, a portion closer to the outer side portion of the thin-walled portion of the valve member) of the inner surface of the hole of the metal plate. The proportion of the lateral sides, covered by the section P2, of the holes of the metal plate is, for example, 20% or greater, preferably 20 to 90%, and more preferably 40 to 80%.

The metal plate and the insulating member have respective holes which communicate with each other. Thus, when the battery internal pressure increases, the valve member can reliably receive the pressure through the holes provided in the metal plate and the insulating member, and the current cut-off mechanism operates stably. The holes of the metal plate are provided in the area other than the central portion (the connection portion with the valve member) of the metal plate.

It is preferable that respective multiple (for example, two to 12, preferably four to eight) holes of the metal plate and the insulating member be provided along the circumferential direction of the metal plate and the insulating member. In this case, when the battery internal pressure increases, the thin-walled portion of the valve member is likely to receive the battery internal pressure uniformly in the circumferential direction. It is sufficient that the lateral side of at least one of the multiple holes be covered by the section P2, and it is preferable that the lateral sides of the multiple holes be each covered by the section P2.

The insulating member includes a resin which can ensure the insulating property, and does not affect to the battery characteristics. The insulating member may further include a filler such as glass fiber. Resins used as the insulating member include, for example, polypropylene (PP), polybutylene terephthalate (PBT), polyphenylene sulfide (PPS), polyamide (PA), polytetrafluoroethylene (PTFE), tetrafluoroethylene-perfluoroalkyl vinyl ether copolymer (PFA). The resins used as the insulating member are preferably PP and PBT among all from the viewpoint of cost advantage, superior heat resistance, and ease of integration with the metal plate by an insert molding.

The insulating member is produced using a general molding technique. The insulating member is preferably produced integrally with the metal plate by an insert molding among all. The insulating member and the metal plate can be bonded by an insert molding without using an adhesive agent. The insulating member integrated with the metal plate can be produced, for example, by loading a metal plate into a predetermined mold, and injecting a molten resin into the mold. By using an insert molding technique, the insulating member can be obtained integrally with the metal plate, and not only the surface, on the valve member side, of the metal plate, but also the inner surface of the hole of the metal plate can be easily covered by the insulating member. In other words, subsequent to the section P1, the section P2 can be easily provided.

Also, the surface, on the valve member side, of the metal plate and the inner surface of the hole of the metal plate as well as the circumferential end face and the surface, on the inner side of the battery (the opposite side to the valve member), of the metal plate may be covered by the insulating member. Specifically, the later-described P3 to P6 may be further provided. Thus, the metal plate can be further protected by the insulating member. Thus, coming off of the metal plate from the insulating member due to deformation of the opening sealing body at the time of battery crush by pressure, and an internal short circuit (contact between the metal plate and the electrode group or the battery can) caused by the coming off of the metal plate are controlled. Also, because of the integration of the insulating member with the metal plate, the thicknesses of the metal plate and the insulating member can be reduced, and accordingly the size of the electrode group can be increased and a higher capacity thereof can be aimed.

When the insulating member is separately produced, then is stacked on and fixed to the metal plate, in order to reduce the positional gap between the holes of the insulating member and the metal plate, the hole diameter of the insulating member needs to be larger than the hole diameter of the metal plate.

In contrast, when the insulating member is produced integrally with the metal plate by an insert molding, the process of stacking and fixing the insulating member on and to the metal plate can be omitted, and the difference between the hole diameters of the insulating member and the metal plate may be reduced, and the hole diameter of the insulating member may be smaller than the hole diameter of the metal plate, as compared with when the insulating member is stacked on and fixed to the metal plate. In other words, when viewed in the thickness direction of the metal plate, the portion exposed from the insulating member in the surroundings of the holes of the metal plate can be reduced or eliminated.

First Embodiment

Figure 1:
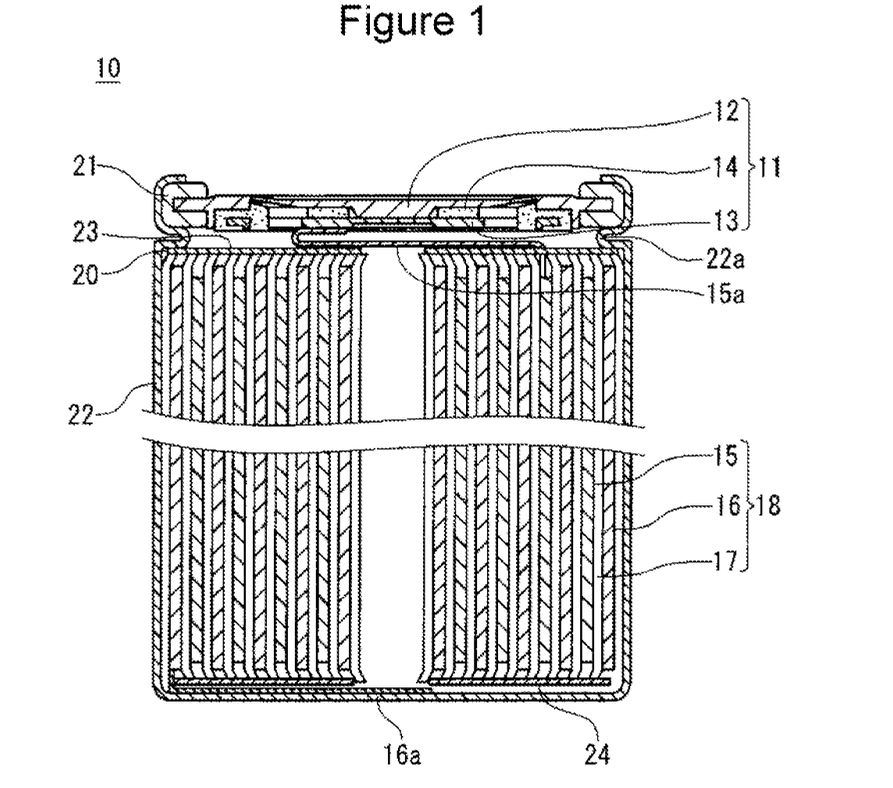
FIG. 1 is a vertical cross-sectional view of a cylindrical battery according to an embodiment of the present invention.
Figure 2:
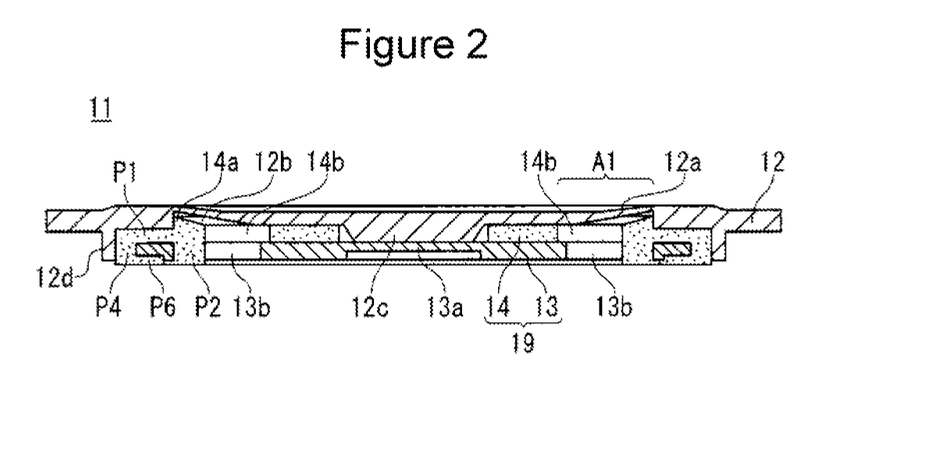
FIG. 2 is an enlarged cross-sectional view of an opening sealing body of FIG. 1.
Figure 3:
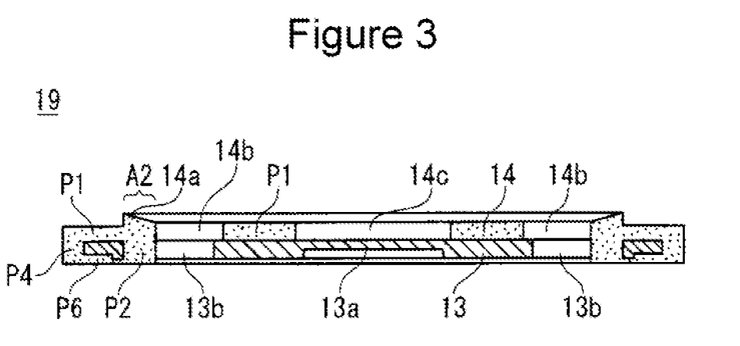
FIG. 3 is a vertical cross-sectional view of a composite body of FIG. 2.
Figure 4:
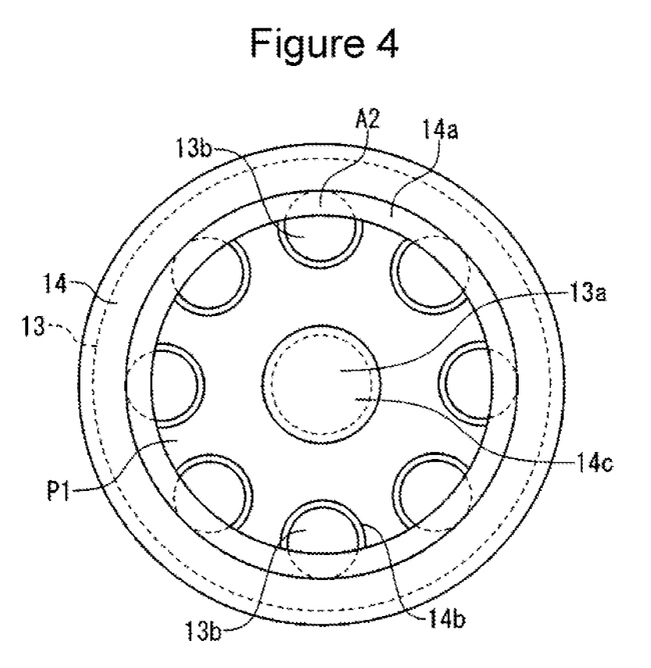
FIG. 4 is a plan view of the composite body of FIG. 2.
Figure 5:
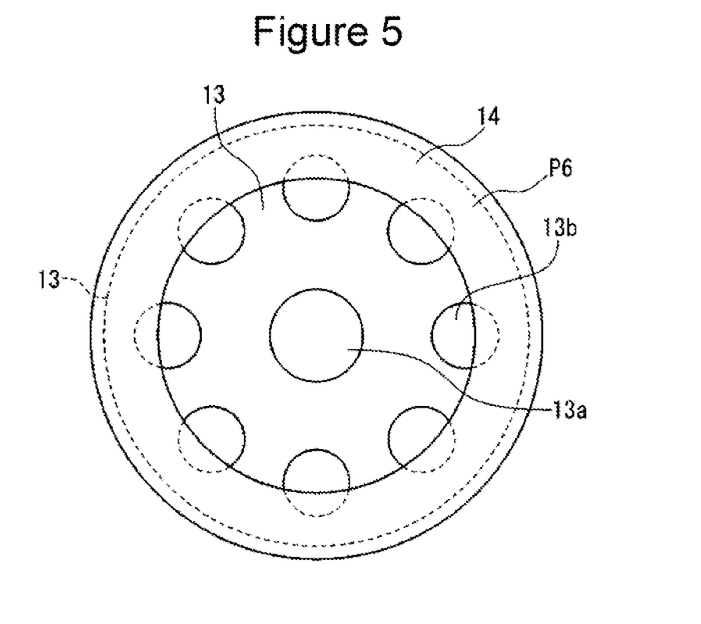
FIG. 5 is a back view of the composite body of FIG. 2.

Hereinafter a non-aqueous electrolyte secondary battery as an example of a cylindrical battery according to an embodiment of the present invention will be described with reference to FIGS. 1 to 5. FIG. 1 is a vertical cross-sectional view of a non-aqueous electrolyte secondary battery. FIG. 2 is a vertical cross-sectional view of an opening sealing body of FIG. 1. FIG. 3 is a vertical cross-sectional view of a composite body of FIG. 2. FIG. 4 is a plan view of the composite body of FIG. 3. FIG. 5 is a back view of the composite body of FIG. 3.

A non-aqueous electrolyte secondary battery (hereinafter a battery) 10 includes an electrode group 18, an electrolyte (not illustrated), and a bottomed cylindrical battery can 22 that houses these. An opening sealing body 11 is caulking-fixed to the opening of the battery can 22 via a gasket 21. Thus, the battery inside is hermetically sealed.

The opening sealing body 11 includes a valve member 12, a metal plate 13, and an annular insulating member 14 interposed between the valve member 12 and the metal plate 13. The valve member 12 and the metal plate 13 are connected to each other at respective central portions. The insulating member 14 provides insulation between the valve member 12 and the metal plate 13 in the area other than the connection portion between the valve member 12 and the metal plate 13. As illustrated in FIGS. 3 to 5, the insulating member 14 is integrated with the metal plate 13 by an insert molding. In other words, the insulating member 14 and the metal plate 13 form a composite body 19.

For example, aluminum or aluminum alloy is used for the valve member 12 and the metal plate 13. The valve member 12 and the metal plate 13 are produced by machine pressing a plate material such as aluminum into a predetermined shape. The central portion of the valve member 12 and the central portion of the metal plate 13 are connected using, for example, a welding technique such as laser welding.

The valve member 12 is circular when viewed in the thickness direction of the metal plate 13, and has an annular thin-walled portion 12a which is deformable when the internal pressure of the battery 10 increases. The thin-walled portion 12a has an inclined area A1 where the thickness of the thin-walled portion 12a is continuously decreased in the radial direction from the center to the circumferential end face, the inclined area A1 being on the surface, on the inner side of the battery 10, of the valve member 12. Thus, the end, on the circumferential end side, of the valve member 12 in the inclined area A1 serves as a starting point of deformation of the valve member 12 when the internal pressure of the battery 10 increases. The rate of change of the thickness of the thin-walled portion 12a (the inclined area) may be constant or may be changed from the center to the circumferential end face. When the valve member 12 is viewed in the thickness direction of the metal plate 13, the length (width) of the annular thin-walled portion 12a (the inclined area A1) in the radial direction equals to, for example, 10 to 80%, preferably 10 to 40% of the radius of the valve member 12.

In the present embodiment, the thickness of the thin-walled portion is continuously decreased from the center to the circumferential end face of the valve member. However, the thickness of the thin-walled portion may be continuously increased from the center to the circumferential end face of the valve member. In this case, the end, on the central side, of the valve member serves as a starting point of deformation of the valve member when the battery internal pressure increases. However, in order to deform the valve member more stably, it is preferable that the thickness of the thin-walled portion be continuously decreased from the center to the circumferential end face of the valve member. Also, although the entire thin-walled portion is the inclined area in the present embodiment, part of the thin-walled portion may be the inclined area.

The metal plate 13 and the insulating member 14 have respective holes 13b and holes 14b which communicate with each other. When the positional gap between corresponding hole 14b and hole 13b needs to be prevented, the hole diameter of the hole 14b is set to be slightly larger than the hole diameter of the hole 13b as illustrated in FIGS. 3 and 4. In contrast, in the case of an insert molding, positional gap between the holes does not occur, thus the hole diameter of the hole 14b may be substantially equal to the hole diameter of the hole 13b, or the hole diameter of the hole 14b may be smaller than the hole diameter of the hole 13b unlike FIGS. 3 and 4. In the present embodiment, eight holes 13b and eight holes 14b are provided along the circumferential direction. However, the number of holes is not limited to this.

The metal plate 13 is circular when viewed in the axial direction of the battery 10. As illustrated in FIGS. 2 to 5, the metal plate 13 has a thin-walled portion 13a at its central portion (the connection portion with the valve member). The surface, on the outer side of the battery 10, of the metal plate may have an annular groove (not illustrated) along the circumferential edge of the thin-walled portion 13a. In this case, when the battery internal pressure reaches a predetermined value, the groove is stably broken. Also, the breaking strength of the groove is easily adjusted.

As illustrated in FIG. 2, the valve member 12 preferably has a protrusion portion 12c at the central portion of the surface on the inner side of the battery. The protrusion portion 12c makes it easy to connect the central portion of the valve member 12 and the central portion of the metal plate 13 as well as to dispose the insulating member 14 between the area other than the central portion of the valve member 12 and the area other than the central portion of the metal plate 13. The protrusion portion 12c is disposed in a hollow portion 14c of the insulating member 14.

As illustrated in FIG. 2, it is preferable that the valve member 12 further have an annular projection portion 12d on the circumferential edge of the surface on the battery inner side. The projection portion 12d makes it easy to fix the composite body 19 to the valve member 12.

An annular groove (not illustrated) may be formed in the valve member 12. In this case, the valve member 12 can operate further stably as an explosion-proof valve. The groove of the valve member 12 may be provided in the thin-walled portion 12a. The cross-sectional shape of the groove of the valve member 12 preferably has a V-character shape or a U-character shape.

As illustrated in FIGS. 2 and 3, the insulating member 14 has the section P1 that covers the surface, on the valve member 12 side, of the metal plate 13. The section P1 covers the area other than the central portion (the thin-walled portion 13a) of the surface, on the valve member 12 side, of the metal plate 13, and has multiple holes 14b. The insulating member 14 has the section P2 that is provided subsequent to the section P1 and covers the inner surface of the hole 13b of the metal plate 13. The section P2 is further provided subsequent to the section P1, and thereby the insulation distance between the valve member (particularly, the portion on the outer side of the thin-walled portion 12a) and the metal plate is largely ensured. In other words, contact between the valve member and the surface, on the valve member side, of the metal plate is controlled by the section P1, and also contact between the valve member and the inner surface of the hole of the metal plate is controlled by the section P2.

It is sufficient that the lateral side of at least one of the multiple holes of the metal plate be covered by the section P2. As illustrated in FIGS. 3 and 4, it is preferable that the lateral sides of the multiple holes 13b be each covered by the section P2. It is sufficient that the section P2 cover at least part (for example, a portion closer to the outer side portion of the thin-walled portion 12a) of the inner surface of the hole 13b of the metal plate 13. The proportion of the lateral sides, covered by the section P2, of the holes 13b of the metal plate 13 is preferably 20 to 90%, and more preferably 40 to 80%.

A recessed portion 12b is formed by the thin-walled portion 12a on the insulating member 14 opposing side of the valve member 12. As illustrated in FIGS. 2 to 4, the section P1 preferably has an annular rib 14a to be housed in the recessed portion 12b. Because of the inclined area of the thin-walled portion 12a, the recessed portion 12b has an inclined face at its bottom, and the rib 14a has an inclined face corresponding to the bottom of the recessed portion 12b.

Since the section P1 further has the rib, the amount of resin (thermal capacity) of the insulating member is increased. Thus, it is possible to reduce the risk of melting of the insulating member due to the heat generated by an external short circuit or the like, and contact between the valve member (particularly, the portion on the outer side of the thin-walled portion 12a) and the metal plate is controlled. In addition, since the rib is housed in the recessed portion formed by the thin-walled portion, the insulation distance between the valve member and the metal plate is further largely ensured.

The ratio of the length (width) of the annular rib 14a in the radial direction to the length (width) of the annular thin-walled portion 12a (the recessed portion 12b) in the radial direction as viewed in the thickness direction of the metal plate 13 is, for example, 10% or greater, and preferably 30% or greater.

In the present embodiment, the annular rib 14a which covers part of the holes 13b is provided. However, the disposition and the shape of the rib are not limited to this. For example, the rib may be disposed between adjacent holes 13b of the metal plate 13 at intervals along the circumferential direction. The shape, disposition, and form of the rib may be determined as appropriate according to the shape and position of the recessed portion.

As illustrated in FIGS. 3 and 4, it is preferable that the section P1 have an area A2 which coves part of the holes 13b (openings) of the metal plate 13, and at least part of the rib 14a be provided in the area A2. In this case, the insulation distance between the valve member (particularly, the portion on the outer side of the thin-walled portion 12a) and the metal plate is further largely ensured. When viewed in the thickness direction of the metal plate 13, the proportion of the holes 13b (openings) of the metal plate 13 covered by the area A2 is, for example, 10 to 80%, and preferably 30 to 60%.

As illustrated in FIGS. 2 and 3, it is preferable that the insulating member 14 further have a section P4 that is provided subsequent to the section P1 and covers the circumferential end face of the metal plate 13. In this case, the insulation distance between the valve member (particularly, the portion on the outer side of the thin-walled portion 12a) and the metal plate is further largely ensured. When the valve member has the projection portion 12d as illustrated in FIG. 2, contact between the projection portion 12d and the metal plate is controlled.

As illustrated in FIGS. 2, 3, and 5, it is preferable that the insulating member 14 further have an annular section P6 that is provided subsequent to the section P2 and the section P4, and covers the surface, on the inner side of the battery 10, of the metal plate 13. In other words, the later-described section P3 and section P5 may be connected. In this case, the metal plate is stably fixed to the insulating member, thus coming off of the metal plate from the insulating member due to deformation of the opening sealing body at the time of battery crush by pressure, and an internal short circuit (contact between the metal plate and the electrode group or the battery can) caused by the coming off of the metal plate are controlled.

As illustrated in FIGS. 3 and 5, the surface, on the inner side of the battery 10, of the metal plate 13 may have an area which is not covered by the section P6 and in which the metal plate 13 is exposed, the area being other than the thin-walled portion 13a. On the surface, on the inner side of the battery 10, of the metal plate 13, it is preferable not to dispose the section P6 and the later-described section P3 and section P5 in at least the area outside the thin-walled portion 13a and inside the holes 13b. The area is utilized for connection to the later-described positive electrode lead 15a.

Figure 6:
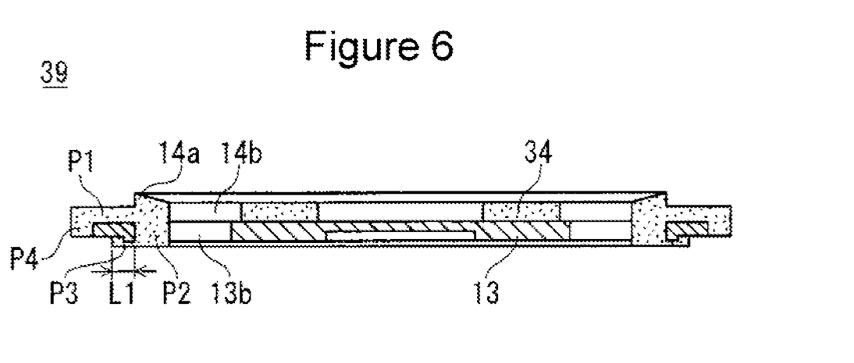
FIG. 6 is a vertical cross-sectional view illustrating a modification of the composite body of FIG. 2.

Instead of the composite body 19 (the insulating member 14) illustrated in FIG. 3, a composite body 39 (an insulating member 34) illustrated in FIG. 6 may be used. The composite body 39 has the same configuration as that of the composite body 19 except that instead of the section P6, the section P3 is provided, which is provided subsequent to the section P2 and covers the surface, on the inner side of the battery 10, of the metal plate 13. The section P3 is provided subsequent to the sections P1 and P2, and the metal plate is thereby stably fixed to the insulating member. Thus, coming off of the metal plate from the insulating member due to deformation of the opening sealing body at the time of battery crush by pressure, and an internal short circuit (contact between the metal plate and the electrode group or the battery can) caused by the coming off of the metal plate are controlled. The composite body 39 may further have the later-described section P5.

It is sufficient that the section P3 cover at least part of the surface, on the inner side of the battery 10, of the metal plate 13, and it is preferable that the section P3 be provided in an annular shape from the section P2 on the surface, on the inner side of the battery 10, of the metal plate 13 toward the circumferential end face. For example, a length L1 of the section P3 illustrated in FIG. 6 is preferably greater than or equal to 0.2 mm, and more preferably greater than or equal to 0.3 mm. The length L1 illustrated in FIG. 6 is, for example, 3% or greater, and preferably 4% or greater of the radius of the metal plate 13.

Figure 7:
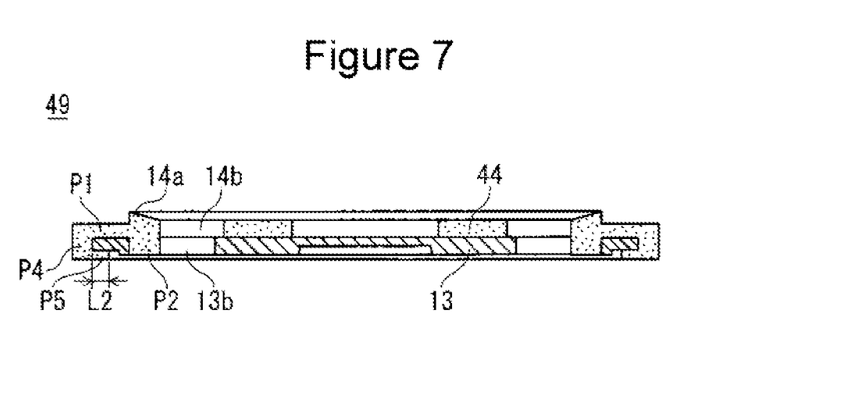
FIG. 7 is a vertical cross-sectional view illustrating another modification of the composite body of FIG. 2.

Also, instead of the composite body 19 (the insulating member 14) illustrated in FIG. 3, a composite body 49 (an insulating member 44) illustrated in FIG. 7 may be used. The composite body 49 has the same configuration as that of the composite body 19 except that instead of the section P6, the section P5 is provided, which is provided subsequent to the section P4 and covers the surface, on the inner side of the battery 10, of the metal plate 13. The section P5 is provided subsequent to the sections P1 and P4, and the metal plate is thereby stably fixed to the insulating member. Thus, coming off of the metal plate from the insulating member due to deformation of the opening sealing body at the time of battery crush by pressure, and an internal short circuit (contact between the metal plate and the electrode group or the battery can) caused by the coming off of the metal plate are controlled. The composite body 49 may further have the section P3.

It is sufficient that the section P5 cover at least part of the surface, on the inner side of the battery 10, of the metal plate 13, and it is preferable that the section P5 be provided to cover the area greater than or equal to 0.2 mm from the circumferential end face of the surface, on the inner side of the battery 10, of the metal plate 13 toward the center. In other words, it is preferable that the length L2 (the radial length of the area where the surface, on the inner side of the battery 10, of the metal plate 13 is covered by the section P5) illustrated in FIG. 7 be greater than or equal to 0.2 mm. In this case, coming off of the metal plate from the insulating member due to deformation of the opening sealing body at the time of battery crush by pressure, and an internal short circuit (contact between the metal plate and the electrode group or the battery can) caused by the coming off of the metal plate are further controlled. The length L2 illustrated in FIG. 7 is more preferably greater than or equal to 0.3 mm. When the insulating member 14 is viewed in the thickness direction of the metal plate 13, the length L2 is, for example, 3% or greater, and preferably 4% or greater of the radius of the metal plate 13. The section P5 may be annular, and may be provided at intervals along the circumferential direction of the metal plate.

Second Embodiment

Figure 8:
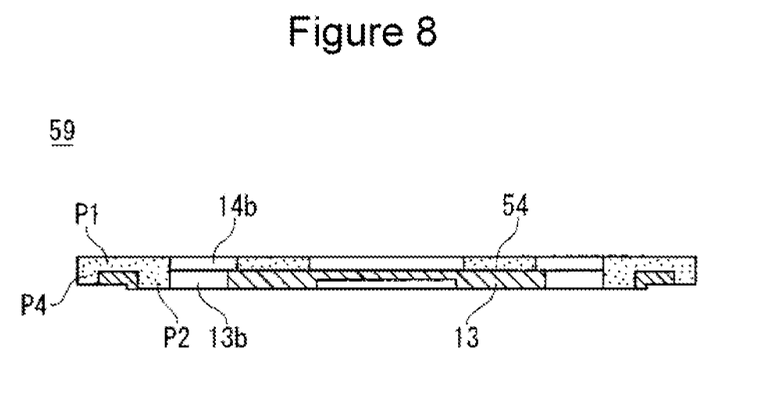
FIG. 8 is a vertical cross-sectional view of a composite body used in a cylindrical battery according to another embodiment of the present invention.

Hereinafter, a cylindrical battery according to another embodiment of the present invention will be described with reference to FIG. 8. FIG. 8 is a vertical cross-sectional view of a composite body used in the cylindrical battery according to another embodiment of the present invention. The battery according to the present embodiment has the same configuration as that of the battery 10 illustrated in FIG. 1 except that instead of the composite body 19 (the insulating member 14) illustrated in FIG. 3, a composite body 59 (an insulating member 54) illustrated in FIG. 8 is used. The composite body 59 includes the metal plate 13 and an insulating member 54. The insulating member 54 has the section P1, the section P2, and the section P4. The composite body 59 has the same configuration as that of the composite body 19 with the section P6 of the insulating member 14 and the rib 14a removed.

Since the insulating member 54 has the section P2 subsequent to the section P1, the insulation distance between the valve member (particularly, the portion on the outer side of the thin-walled portion 12a) and the metal plate is largely ensured. In other words, contact between the valve member and the surface, on the valve member side, of the metal plate is controlled by the section P1, and also contact between the valve member and the inner surface of the hole of the metal plate is controlled by the section P2.

Hereinafter, the current cut-off mechanism will be described.

When the battery internal pressure increases due to an external short circuit or the like, the valve member 12 receives the pressure through the holes 13b of the metal plate 13 and the holes 14b of the insulating member 14, and the thin-walled portion 12a of the valve member 12 is deformed. Accordingly, the central portion of the valve member 12 is pulled outwardly of the battery along with the central portion of the metal plate 13. When the battery internal pressure reaches a predetermined value, the annular groove (not illustrated) provided in the surroundings of the connection portion of the metal plate 13 with the valve member 12 is broken, and a current path between the valve member 12 and the metal plate 13 is cut off.

In the case where the metal plate 13 has no groove, a configuration may be adopted in which when the battery internal pressure reaches a predetermined value, the connection portion (welded portion) between the metal plate 13 and the valve member 12 is broken (a configuration in which the central portion of the metal plate 13 is detached from the central portion of the valve member 12). The breaking strength of a groove of the metal plate is easier to be adjusted than the breaking strength of the connection portion (welded portion), thus the metal plate 13 preferably has a groove in the surroundings of the connection portion with the valve member 12. The cross-sectional shape of the groove of the metal plate 13 preferably has a V-character shape or a U-character shape.

A positive electrode lead 15a drawn from a positive electrode plate 15 is connected to the metal plate 13. Thus, the valve member 12 functions as an external terminal of the positive electrode. A negative electrode lead 16a drawn from a negative electrode plate 16 is connected to the bottom internal surface of the battery can 22.

For example, iron, iron alloy, stainless steel, aluminum, and aluminum alloy are used as the material for the battery can 22. An annual groove 22a is formed in the vicinity of the opening end of the battery can 22. A first insulating plate 23 is disposed between one end face of the electrode group 18 and the annual groove 22a. A second insulating plate 24 is disposed between the other end face of the electrode group 18 and the bottom of the battery can 22.

The electrode group 18 is formed by winding the positive electrode plate 15, the negative electrode plate 16, and a separator 17 interposed therebetween.

The positive electrode plate 15 includes a foil positive electrode current collector, and a positive electrode active material layer formed on its surface. For example, aluminum, aluminum alloy, stainless steel, titanium, and titanium alloy are used as the material for the positive electrode current collector. A lithium transition metal composite oxide is preferably used as the positive electrode active material. For example, a composite oxide is used, which includes at least one type selected from a group and lithium, the group consisting of cobalt, manganese, nickel, chromium, iron, and vanadium.

The negative electrode plate 16 includes a foil negative electrode current collector, and a negative electrode active material layer formed on its surface. For example, copper, copper alloy, nickel, nickel alloy, and stainless steel are used as the material for the negative electrode current collector. A carbon material which can reversibly occlude and discharge lithium ions, for example, natural graphite, artificial graphite, hard carbon, soft carbon, tin oxide, and oxide silicon may be used as the negative electrode active material.

For example, a microporous membrane composed of polyolefin may be used as the separator 17. As polyolefin, polyethylene, polypropylene, and ethylene-propylene copolymer may be exemplified.

The electrolyte includes a non-aqueous solvent, and lithium salt dissolved in the non-aqueous solvent. As the non-aqueous solvent, a cyclic carbonate such as an ethylene carbonate, a propylene carbonate, and a butylene carbonate, a chain carbonate such as a dimethyl carbonate, a diethyl carbonate, and an ethyl methyl carbonate, a carboxylic acid ester, and a chain ether are used. As the lithium salt, $LiPF_6$, $LiBF_4$, $LiClO_4$, and the like are used.

INDUSTRIAL APPLICABILITY

The cylindrical battery according to the present invention is useful as a small-sized electronic device such as a notebook personal computer, a power tool for an electric tool and an electric power-assisted bicycle, and a driving power source for an electric automobile.

REFERENCE SIGNS LIST

10 NON-AQUEOUS ELECTROLYTE SECONDARY BATTERY
11 OPENING SEALING BODY
12 VALVE MEMBER
12a THIN-WALLED PORTION
12b RECESSED PORTION
12c PROTRUSION PORTION
12d PROJECTION PORTION
13 METAL PLATE
13a THIN-WALLED PORTION
13b HOLE
14, 34, 44, 54 INSULATING MEMBER
14a RIB
14b HOLE
14c HOLLOW PORTION
15 POSITIVE ELECTRODE PLATE
15a POSITIVE ELECTRODE LEAD
16 NEGATIVE ELECTRODE PLATE
16a NEGATIVE ELECTRODE LEAD
17 SEPARATOR
18 ELECTRODE GROUP
19, 39, 49, 59 COMPOSITE BODY
21 GASKET
22 BATTERY CAN
22a GROOVE
23 FIRST INSULATING PLATE
24 SECOND INSULATING PLATE

The invention claimed is:

1. A cylindrical battery comprising: an electrode group; an electrolyte; a battery can that houses the electrode group and the electrolyte; and an opening sealing body that seals an opening of the battery can,
    the opening sealing body including a valve member, a metal plate disposed on an inner side of the battery with respect to the valve member, and an annular insulating member interposed between the valve member and the metal plate,
    wherein the valve member and the metal plate are connected to each other at respective central portions, the valve member has an annular thin-walled portion which is deformable when an internal pressure of the battery increases, the metal plate and the insulating member have respective holes which communicate with each other, wherein a plurality of the holes of the metal plate and a plurality of the holes of the insulating member are provided, the insulating member has a section P1 that covers a surface, on the valve member side, of the metal plate, and a section P2 that is provided adjacent to the section P1 and covers an inner lateral surface of the holes of the metal plate, wherein a proportion of lateral sides, covered by the section P2, of the holes of the metal plate is from 20% to 90%, and wherein the insulating member has a section P3 that is extended from the section P2 and covers a surface of the metal plate, said surface of the metal plate facing toward the electrode group in a thickness direction of the metal plate.

2. The cylindrical battery according to claim 1, wherein the insulating member further has a section P4 that is provided adjacent to the section P1 and covers a circumferential end face of the metal plate.

3. The cylindrical battery according to claim 2, wherein the insulating member further has a section P5 that is provided adjacent to the section P4 and covers a surface, on an inner side of the battery, of the metal plate.

4. The cylindrical battery according to claim 3, wherein the section P5 is provided to cover an area greater than or equal to 0.2 mm from the circumferential end face of the surface, on the inner side of the battery, of the metal plate toward a center.

5. The cylindrical battery according to claim 1, wherein a recessed portion is formed by the thin-walled portion on the insulating member opposing side of the valve member, and the section P1 has a rib to be housed in the recessed portion.

6. The cylindrical battery according to claim 5, wherein the section P1 has an area which covers part of the holes of the metal plate, and at least part of the rib is provided in the area.

7. The cylindrical battery according to claim 1, wherein the insulating member is integrated with the metal plate by adhesive bonding.

* * * * *